US008833722B2

(12) United States Patent
Cummins et al.

(10) Patent No.: US 8,833,722 B2
(45) Date of Patent: *Sep. 16, 2014

(54) APPARATUS FOR TRANSPORT OF EQUIPMENT AND METHOD FOR MANUFACTURE THEREOF

(75) Inventors: David S. Cummins, Georgetown, TX (US); Curt A. Jackson, Austin, TX (US); James N. Cook, Jr., Round Rock, TX (US)

(73) Assignee: Toppan Photomasks, Inc., Round Rock, TX (US)

( * ) Notice: Subject to any disclaimer, the term of this patent is extended or adjusted under 35 U.S.C. 154(b) by 461 days.

This patent is subject to a terminal disclaimer.

(21) Appl. No.: 12/769,330

(22) Filed: Apr. 28, 2010

(65) Prior Publication Data
US 2010/0294175 A1    Nov. 25, 2010

Related U.S. Application Data

(63) Continuation-in-part of application No. 12/471,089, filed on May 22, 2009, now Pat. No. 8,172,194.

(51) Int. Cl.
*F16M 1/00* (2006.01)
*F16F 9/54* (2006.01)
*F16F 15/02* (2006.01)

(52) U.S. Cl.
CPC . *F16F 15/02* (2013.01); *F16F 9/54* (2013.01); *F16F 2230/0076* (2013.01); *B65G 2205/06* (2013.01)
USPC ........................................ 248/618; 108/57.12

(58) Field of Classification Search
USPC ................. 248/618, 584, 157, 421, 581, 622; 108/57.12, 144.11, 145, 106, 136; 267/217, 241, 242, 245, 256, 113, 118
See application file for complete search history.

(56) References Cited

U.S. PATENT DOCUMENTS

| 2,998,980 | A | * | 9/1961 | Ulinski | 280/124.113 |
| 3,606,704 | A | * | 9/1971 | Denton | 52/167.8 |
| 3,994,017 | A | | 11/1976 | Barkhuff et al. | 360/98 |
| 4,589,620 | A | | 5/1986 | Sakamoto | 248/550 |
| 4,764,075 | A | * | 8/1988 | Cox et al. | 108/136 |

(Continued)

FOREIGN PATENT DOCUMENTS

| DE | 8801675 | 2/1989 | B65D 19/38 |
| GB | 858457 | 10/1957 | |
| GB | 1100123 | 3/1966 | F16F 13/00 |

OTHER PUBLICATIONS

International Preliminary Report on Patentability; PCT/US2010/035510; pp. 12, Dec. 1, 2011.

(Continued)

*Primary Examiner* — Alfred J Wujciak
(74) *Attorney, Agent, or Firm* — Baker Botts L.L.P.

(57) ABSTRACT

An apparatus for transporting equipment and a method for the manufacture of the apparatus are disclosed. A method of manufacture may include providing a first platform having a substantially planar first surface. The method may also include providing a second platform having a substantially planar second surface substantially parallel to the first surface. The method may further include mechanically coupling the second surface to the first surface via a plurality of compression springs allowing movement of the second platform relative to the first platform. Additionally, the method may include mechanically coupling a bearing assembly configured to maintain registration of the second platform relative to the first platform.

18 Claims, 5 Drawing Sheets

(56) References Cited

U.S. PATENT DOCUMENTS

| | | | |
|---|---|---|---|
| 4,852,675 A | 8/1989 | Wang | 177/208 |
| 4,871,189 A * | 10/1989 | Van Breemen | 267/64.27 |
| 4,887,537 A | 12/1989 | Kellogg | 108/55.1 |
| 5,141,261 A | 8/1992 | Ziu | 285/138 |
| 5,193,631 A | 3/1993 | Lannie et al. | 177/208 |
| 5,222,709 A | 6/1993 | Culley, Jr. et al. | 248/421 |
| 5,366,048 A | 11/1994 | Watanabe et al. | 188/267 |
| 5,454,451 A | 10/1995 | Kawamata et al. | 188/267 |
| 6,237,795 B1 | 5/2001 | Buckley et al. | 220/1.5 |
| 6,286,805 B1 | 9/2001 | Bunn et al. | 248/544 |
| 6,336,627 B1 | 1/2002 | Fujita et al. | 267/131 |
| 6,382,369 B1 | 5/2002 | Lisenker | 188/267.2 |
| 6,866,236 B2 * | 3/2005 | Mullinix et al. | 248/421 |
| 6,923,298 B2 | 8/2005 | Tanner | 188/267 |
| 6,953,108 B2 * | 10/2005 | Anderfaas et al. | 188/267.2 |
| 7,331,627 B2 | 2/2008 | Van Den Brink et al. | 296/190.07 |
| 7,383,923 B2 | 6/2008 | Patten et al. | 187/269 |
| 7,413,158 B1 * | 8/2008 | Burer | 248/564 |
| 8,172,194 B2 * | 5/2012 | Cummins et al. | 248/618 |
| 8,347,793 B2 * | 1/2013 | Cummins et al. | 108/57.12 |
| 2001/0035600 A1 | 11/2001 | St. Clair | 267/131 |
| 2007/0010935 A1 | 1/2007 | Aldeeb et al. | 701/124 |
| 2010/0179730 A1 | 7/2010 | Hiemenz et al. | 701/45 |

OTHER PUBLICATIONS

Invitation to Pay Additional Fees and Communication Relating to the Results of the Partial International Search; PCT/US2010/035510; pp. 5, Aug. 5, 2010.

International Search Report and Written Opinion; PCT/US2010/035510; pp. 21.

* cited by examiner

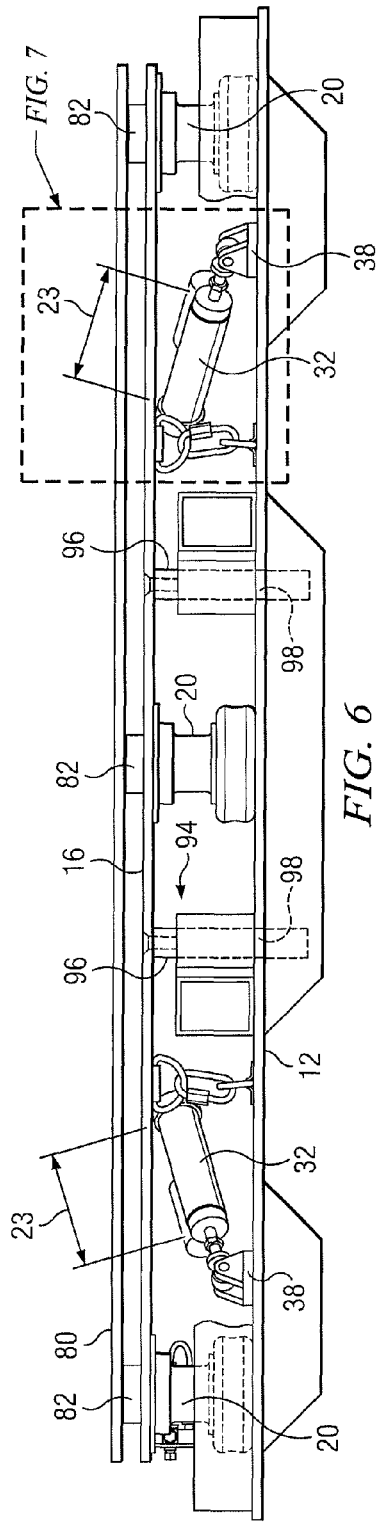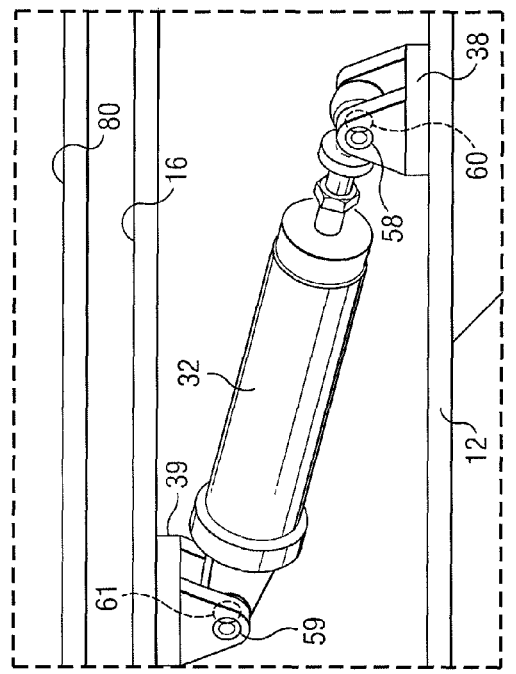

APPARATUS FOR TRANSPORT OF EQUIPMENT AND METHOD FOR MANUFACTURE THEREOF

RELATED APPLICATIONS

This application is a Continuation-In-Part of application Ser. No. 12/471,089, filed on May 22, 2009, now U.S. Pat. No. 8,172,194 and hereby incorporated by reference.

This application is related to copending Patent Application entitled "Apparatus for Transport of Equipment and Method for Manufacture Thereof," application Ser. No. 12/769,344, filed on the same date of the present application, which is incorporated by reference herein.

TECHNICAL FIELD

This disclosure relates in general to transport of equipment and, more particularly, to reducing mechanical shock associated with transporting sensitive equipment.

BACKGROUND OF THE DISCLOSURE

Many industries rely on any number of large and sophisticated items of equipment to assist in the design, development, testing, and/or verification of products. For example, in the photolithography industry, sophisticated equipment is often used to detect fabrication defects in photomasks and/or semiconductor wafers patterned from photomasks. Often, such items of equipment must be manufactured within strict tolerances, and are therefore typically susceptible to mechanical vibration and shock. Accordingly, when such items are transported, measures must be taken to reduce mechanical vibration and shock inherent in transportation that may damage the transported equipment.

However, traditional approaches to transportation of large, sensitive items of equipment have many disadvantages. For example, to reduce mechanical vibration and shock, equipment moved within a facility is often moved slowly (e.g., at less than 3 miles per hour). However, such an approach is impractical for transcontinental and/or transoceanic transport of equipment, which must necessarily occur at greater speeds and unpredictable conditions (e.g., "bumpy" roads and highways, varying traffic conditions, harsh seas, airplane landings, airplane takeoffs, airplane turbulence, etc.). To better protect equipment for transcontinental and/or transoceanic transport of equipment, many types of pallets and crates have been developed, but most have been found to not provide adequate protection to the equipment, resulting in costly repairs.

SUMMARY OF THE DISCLOSURE

In accordance with the present disclosure, the disadvantages and problems associated with transporting sensitive equipment have been reduced or eliminated.

In accordance with an embodiment of the present disclosure, an apparatus for transporting equipment may include a first platform having a substantially planar first surface, a second platform having a substantially planar second surface substantially parallel to the first surface, and a damping assembly. The second platform may be mechanically coupled to the first platform via a plurality of compression springs allowing movement of the second platform relative to the first platform. The damping assembly may be configured to dampen movement of the second platform relative to the first platform. The damping assembly may include an arm and a shock absorber. The arm may be located between the first surface and the second surface and may be pivotally coupled to the first platform and slidably coupled to the second platform. The shock absorber may be coupled between the first platform and the arm, such that the shock absorber dampens rotation of the arm to dampen movement of the second platform relative to the first platform.

In accordance with another embodiment of the present disclose, a damping assembly configured to dampen movement of a first item relative to a second item may include an arm and a shock absorber. The arm may be configured to be located between the first item and the second item and may be configured to pivotally couple to the first item and configured to slidably couple to the second item. The shock absorber may be configured to couple between the first item and the arm, such that the shock absorber dampens rotation of the arm to dampen movement of the first item relative to the second item.

In accordance with a further embodiment of the present disclosure, a method of manufacture is provided. The method may include providing a first platform having a substantially planar first surface. The method may also include providing a second platform having a substantially planar second surface substantially parallel to the first surface. The method may additionally include mechanically coupling the second surface to the first surface via a plurality of compression springs allowing movement of the second platform relative to the first platform. The method may further include pivotally coupling an arm to the first platform. Moreover, the method may include slidably coupling the arm to the second platform. The method may also include coupling a shock absorber between the first platform and the arm, such that the shock absorber dampens rotation of the arm to dampen movement of the second platform relative to the first platform.

In accordance with yet another embodiment of the present disclosure, an apparatus for transporting equipment may include a first platform having a substantially planar first surface, a second platform having a substantially planar second surface substantially parallel to the first surface; and a bearing assembly mechanically coupled to the first platform and the second platform. The second platform may be mechanically coupled to the first platform via a plurality of compression springs allowing movement of the second platform relative to the first platform. The bearing assembly may be configured to maintain registration of the second platform relative to the first platform.

In accordance with yet another embodiment of the present disclosure, a method of manufacture may be provided. The method may include providing a first platform having a substantially planar first surface. The method may also include providing a second platform having a substantially planar second surface substantially parallel to the first surface. The method may further include mechanically coupling the second surface to the first surface via a plurality of compression springs allowing movement of the second platform relative to the first platform. Additionally, the method may include mechanically coupling a bearing assembly configured to maintain registration of the second platform relative to the first platform.

In accordance with another embodiment of the present disclosure, an apparatus for transporting equipment may include a first platform having a substantially planar first surface, a second platform having a substantially planar second surface substantially parallel to the first surface, and a damping assembly mechanically coupled to the first platform and the second platform. The second platform may be mechanically coupled to the first platform via a plurality of compression springs allowing movement of the second platform relative to the first platform. The damping assembly may include a shock absorber mechanically coupled between the first platform and the second platform and configured to dampen movement of the second platform relative to the first platform.

In accordance with yet another embodiment of the present disclosure, an apparatus for transporting equipment, may include a first platform having a substantially planar first surface, a second platform having a substantially planar second surface substantially parallel to the first surface, at least one weight sensor mechanically coupled to the second platform, and a compression spring control module communicatively coupled to at least one compression spring of the plurality of compression springs and the at least one weight sensor. The second platform may be mechanically coupled to the first platform via a plurality of compression springs allowing movement of the second platform relative to the first platform. The at least one weight sensor may be configured to measure a portion of weight of a load upon the apparatus. The compression spring module may be configured to tune the at least one compression spring based at least on the portion of weight of the load measured by the at least one weight sensor.

In accordance with yet another embodiment of the present disclosure, a method of manufacture may be provided. The method may include providing a first platform having a substantially planar first surface. The method may also include providing a second platform having a substantially planar second surface substantially parallel to the first surface. The method may further include mechanically coupling the second surface to the first surface via a plurality of compression springs allowing movement of the second platform relative to the first platform. Additionally, the method may include mechanically coupling at least one weight sensor to the second platform, the at least one weight sensor configured to measure a portion of weight of a load upon the apparatus. Moreover, the method may include communicatively coupling a compression spring control module to at least one compression spring of the plurality of compression springs and the at least one weight sensor, the compression spring module configured to tune the at least one compression spring based at least on the portion of weight of the load measured by the at least one weight sensor.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 6 illustrates an elevation view of certain elements of the equipment transport apparatus depicted in FIG. 5, according to one or more embodiments of the present disclosure; and FIG. 7 illustrates a close-up elevation view of certain elements of the equipment transport apparatus depicted in FIG. 5, according to one or more embodiments of the present disclosure.

DETAILED DESCRIPTION OF THE DISCLOSURE

Embodiments of the present disclosure and their advantages are best understood by reference to FIGS. 1 through 7, where like numbers are used to indicate like and corresponding parts.

Figure 1:
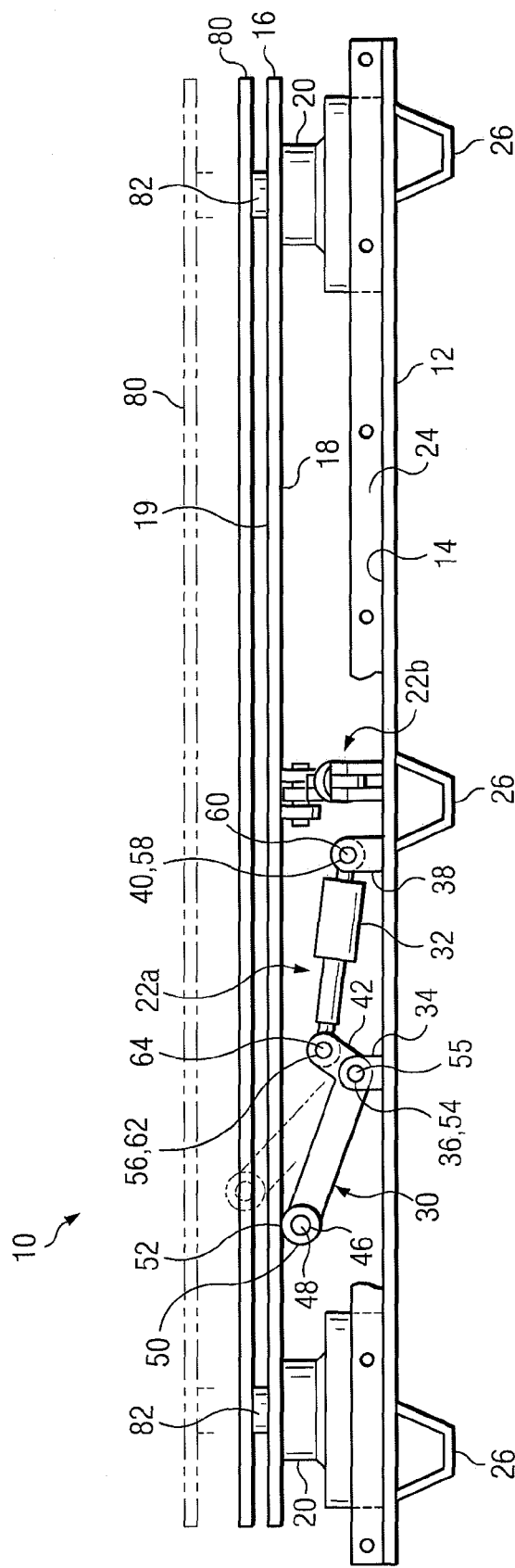
FIG. 1 illustrates an elevation view of an equipment transport apparatus, according to one or more embodiments of the present disclosure.
Figure 2:
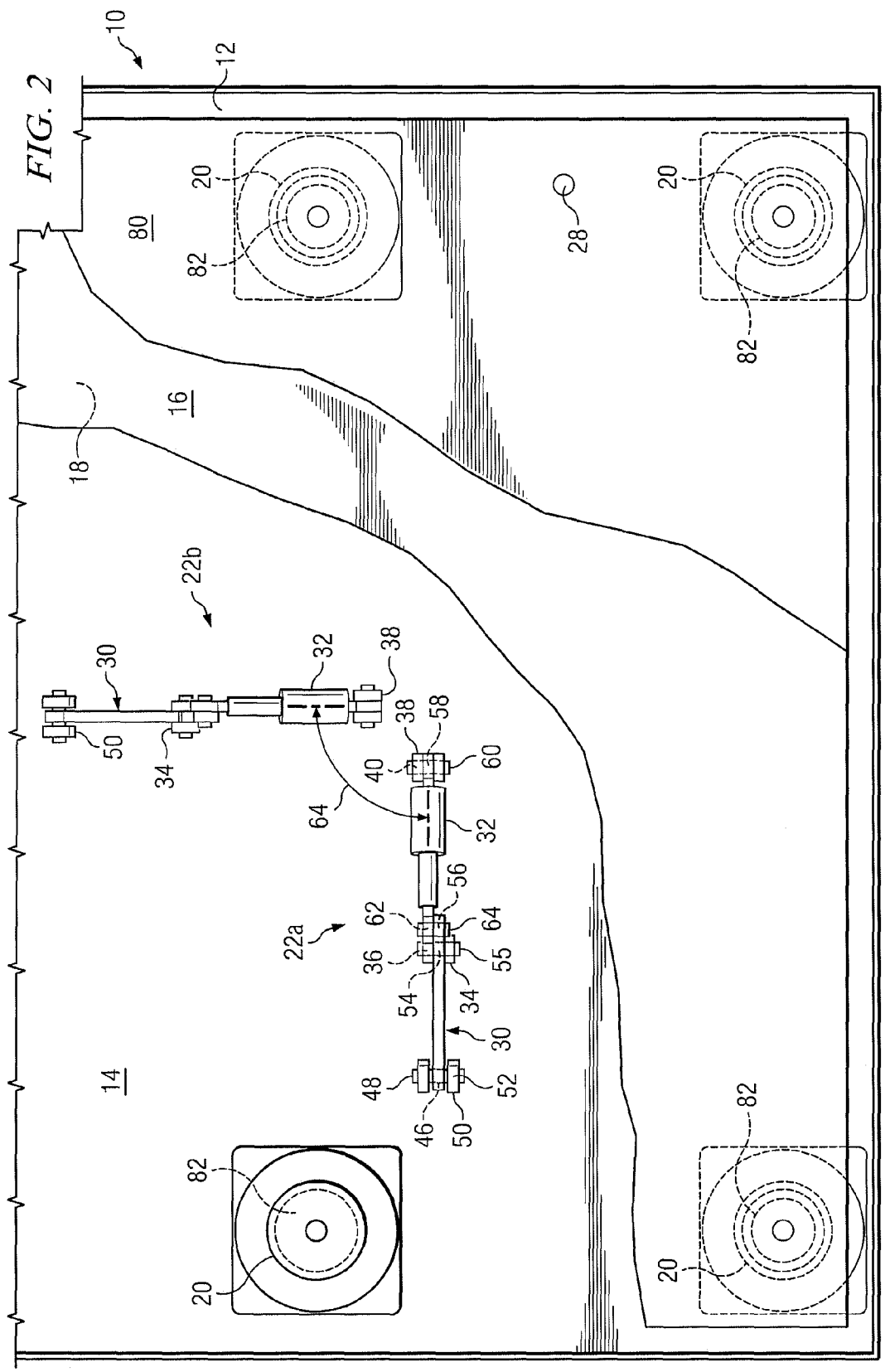
FIG. 2 illustrates a plan view of the equipment transport apparatus depicted in FIG. 1, according to one or more embodiments of the present disclosure.
Figure 3:
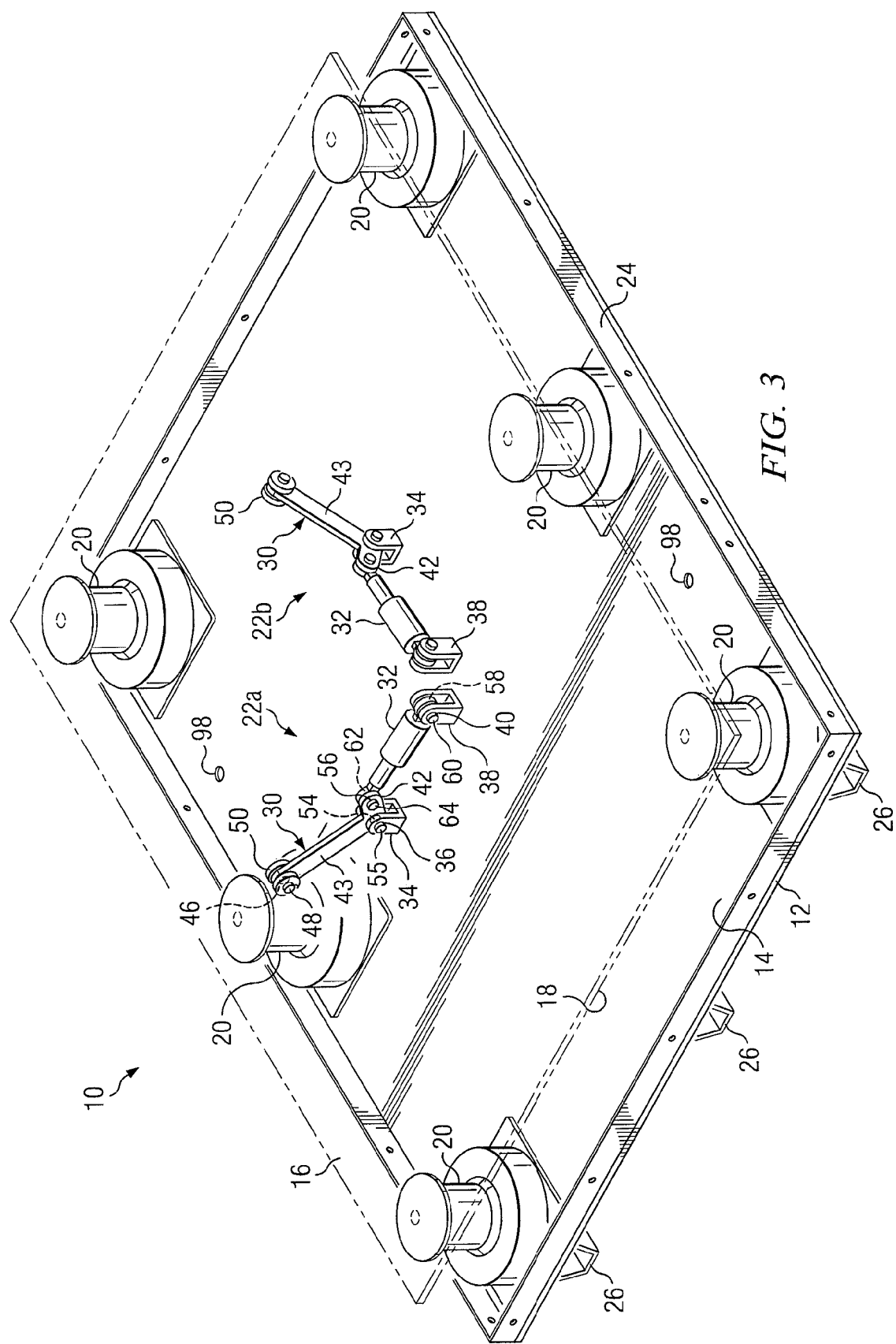
FIG. 3 illustrates an isometric view of the equipment transport apparatus depicted in FIG. 1, according to one or more embodiments of the present disclosure.
Figure 4:
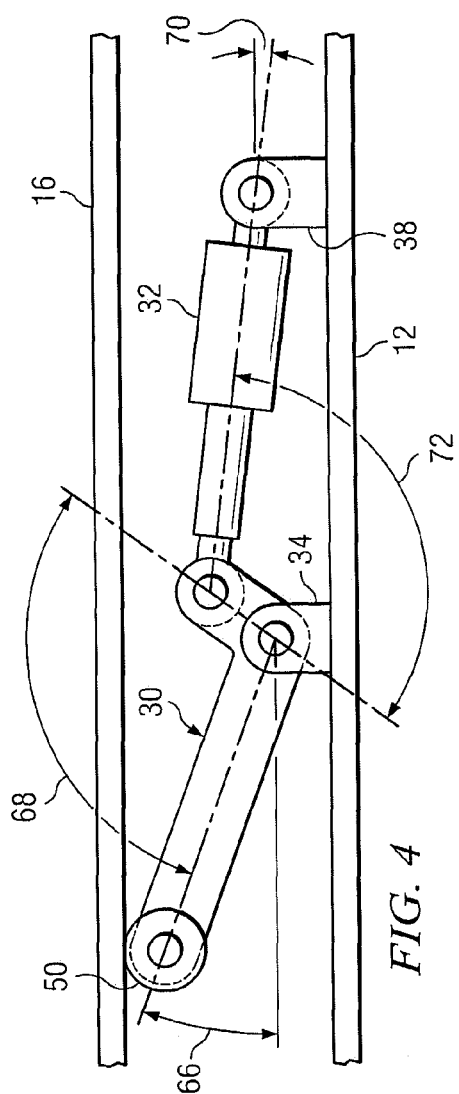
FIG. 4 illustrates a close-up elevation view of certain elements of the equipment transport apparatus depicted in FIG. 1, according to one or more embodiments of the present disclosure.

FIGS. 1-4 illustrate various views of an equipment transport apparatus 10, according to one or more embodiments of the present disclosure. FIG. 1 illustrates an elevation view, FIG. 2 illustrates a plan view, FIG. 3 illustrates an isometric view, and FIG. 4 illustrates a close-up elevation view.

As depicted in FIGS. 1-4, apparatus 10 may include a first platform 12, a second platform 16, a third platform 80, compression springs 20, damping assemblies 22a and 22b (which may be referred to herein individually as "damping assembly 22" and collectively as "damping assemblies 22"), weight sensors 82, compression spring control modules 84, conduits 90, bearing assemblies 94, skirt 24, and reliefs 26.

Each of first platform 12, second platform 16, and third platform 80 may include and/or may be constructed from any suitable material for transporting equipment and may be of any suitable dimensions. Such material may be selected based on one or more factors, including without limitation weight, durability, flexibility, temperature expansion, compatibility with equipment being transported, ferromagnetic or non-ferromagnetic properties, etc. In some embodiments, one or more of first platform 12, second platform 16, and third platform 80 may comprise aluminum. Dimensions of first platform 12, second platform 16, and third platform 80 may be selected based on one or more factors, including without limitation the size of the equipment to be transported, the weight of the equipment to be transported, the sensitivity of the equipment to be transported, etc.

As depicted in FIGS. 1-4, first platform 12 may include a substantially planar first surface 14. First surface 14 may have coupled thereto pivot support members 34 and 38. Each pivot support member 34, 38 may be configured to pivotally couple another component of apparatus 10 to first platform 12, as described in greater detail below. For example, pivot support members 34 and 38 may include openings 36 and 40, respectively, configured to receive a bearing, wherein other components of apparatus 10 may pivot about the bearing, as described in greater detail below.

Second platform 16 may include a substantially planar second surface 18 and a substantially planar third surface 19. Second platform 16 may be mechanically coupled to first platform 12 via compression springs 20 that allow controlled movement of second platform 16 relative to first platform 12 (e.g., compression springs 20 will resist compression of second platform 16 relative to first platform 12 in a direction perpendicular to the first surface).

In certain embodiments, second platform 16 may be coupled to first platform 12 such that second surface 18 is substantially parallel to first surface 14. In some embodiments, at least one of the compression springs 20 may comprise a gas spring (e.g., a Barrymount SLM-12 mount). In the same or alternative embodiments, each of compression springs 20 may be individually tuned (e.g., tuning of the compression resistance of each spring) to account for any weight non-uniformity of equipment to be transported. Individual tuning of compressions springs 20 may be discussed in greater detail below with respect to discussion of compression spring control modules 84. Although FIGS. 1-4 depict apparatus 10 having six compression springs 20, apparatus 10 may include any suitable number of compression springs 20.

Each damping assembly 22 may be configured to dampen movement of second platform 16 relative to first platform 12. In some embodiments, each damping assembly 22 may be configured to dampen movement of second platform 16 relative to first platform 12 in an axis substantially perpendicular to first surface 14 (e.g., dampening vertical movement of second platform 16 relative to first platform 12). In the same or alternative embodiments, each damping assembly 22 may be configured to dampen movement of second platform 16 relative to first platform 12 in an axis substantially parallel to first surface 14. (e.g., dampening horizontal movement of second platform 16 relative to first platform 12). In the same or alternative embodiments, damping assembly 22a may be configured to dampen movement of second platform 16 relative to first platform 12 in a first axis substantially parallel to first surface 14 and damping assembly 22b may be configured to dampen movement of second platform 16 relative to first platform 12 in a second axis substantially parallel to first surface 14 and substantially perpendicular to the first axis (e.g., such that damping assembly 22a and damping assembly 22b cooperate to dampen in all three normal axes). Although FIGS. 1-4 depict apparatus 10 having two damping assemblies 22, apparatus 10 may include any suitable number of damping assemblies 22.

As shown in FIGS. 1-4, each damping assembly 22 may include an arm 30 and a shock absorber 32. Arm 30 may be pivotally coupled to first platform 12 and slideably coupled to second platform 16, such that arm 30 is located between first surface 14 and second surface 18. Arm 30 may include an elbow 42, a first extension 43 extending from elbow 42, and a second extension 44 nonparallel to first extension 43 and extending from the elbow 42.

Elbow 42 may include an opening 54 configured to receive bearing 55 to pivotally couple arm 30 to first platform 12 via pivot support member 34. First extension 43 may include, at an end distal to elbow 42, an opening 46 configured to receive a bearing 48. One or more wheels 50, each having a circumferential surface 52, may be coupled via their axes to arm 30 via opening 46 and bearing 48. Accordingly, at least a portion of circumferential surface 52 may be coupled to second surface 18, thus slideably coupling arm 30 to second platform 16. Second extension 44 of arm 30 may include, at an end distal to elbow 42, an opening 56 configured to receive bearing 62 to pivotally couple shock absorber 32 to arm 30, as described in greater detail below. In certain embodiments, an arm angle 68 defined by first extension 43 and second extension 44 may be approximately 106 degrees. Although first extension 43 is depicted in FIGS. 1-4 as being longer than second extension 44, each of first extension 43 and second extension 44 may be of any suitable length, and the length of first extension 43 relative to the length of second extension 44 may be of any suitable ratio.

Shock absorber 32 may include any mechanical device designed to smooth out or damp shock impulse, and dissipate kinetic energy (e.g., a Penske 8300 shock absorber). Shock absorber 32 may be coupled between first platform 12 and arm 30, such that shock absorber dampens rotation of arm 30 to dampen movement of second platform 16 relative to first platform 12. As shown in FIGS. 1-4, shock absorber 32 may include an opening 62 configured to receive a bearing 64 to pivotally couple arm 30 to shock absorber 32 via opening 56. In the same or alternative embodiments, shock absorber 32 may include an opening 58 configured to receive a bearing 60 to pivotally couple shock absorber 32 to first platform 12 via pivot support member 38. In some embodiments, a pivot angle 72 defined by second extension 44 and the longitudinal axis of shock absorber 32 may be approximately 121 degrees.

In some embodiments, a damping assembly offset angle 64 may be approximately ninety degrees, wherein damping assembly offset angle is defined by a first line and a second line, the first line defined by a first point at which shock absorber 32 of damping assembly 22a is coupled to first platform 12 and a second point at which arm 30 of damping assembly 22a is coupled to first platform 22a, and the second line defined by a third point at which shock absorber 32 of damping assembly 22b is coupled to first platform 12 and a fourth point at which arm 30 of damping assembly 22b is coupled to first platform 12.

Figure 5:
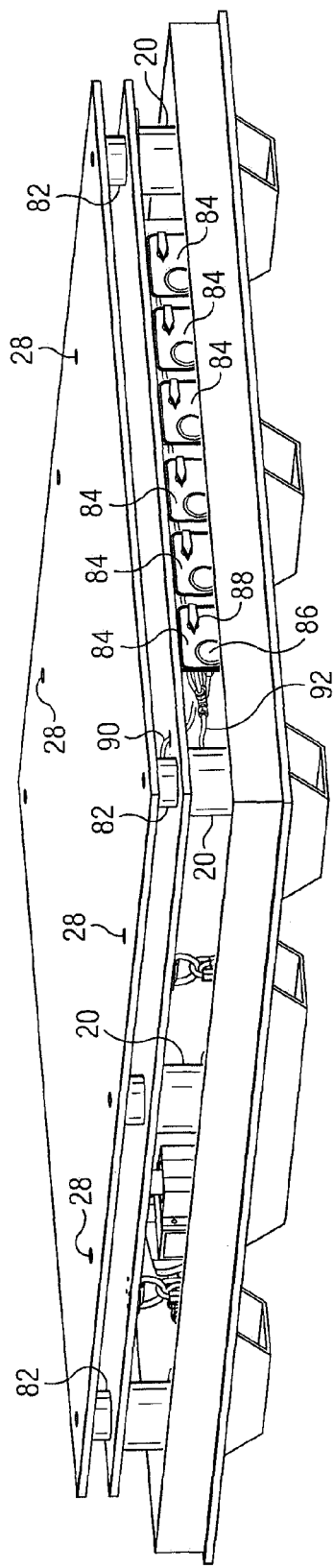
FIG. 5 illustrates an isometric view of another embodiment of an equipment transport apparatus, according to one or more embodiments of the present disclosure.

In certain embodiments of apparatus 10, damping assembly 23 may be substituted for damping assembly 22, as depicted in FIGS. 5-7, for example. FIGS. 5-7 illustrate various views of equipment transport apparatus 10, according to one or more embodiments of the present disclosure. FIG. 5 illustrates an isometric view, FIG. 6 illustrates an elevation view and FIG. 7 illustrates a close-up elevation view.

As shown in FIGS. 5-7, each damping assembly 23 may include a shock absorber 32. Shock absorber 32 depicted in FIGS. 5-7 may be similar or identical to shock absorber 32 depicted in FIGS. 1-4. As shown in FIGS. 5-7, shock absorber 32 may include an opening 58 configured to receive a bearing 60 to pivotally couple shock absorber 32 to first platform 12 via pivot support member 38. In addition or alternatively shock absorber 32 may include an opening 59 configured to receive a bearing 61 to pivotally couple shock absorber 32 to second platform 16 via a pivot support member 39 mounted to second surface 18 of second platform 16. In some embodiments, a shock absorber 32 may comprise a magnetoheological fluid damper.

Damping assemblies 22 and/or 23 may be oriented in any suitable configuration with respect to other components of apparatus 10. For example, damping assemblies 22 and/or 23 may be oriented such that they are generally parallel to an edge of first platform 12 (e.g., as shown in FIGS. 2 and 3), may be oriented such that they are generally 45 degrees offset from edges of first platform 12 (e.g., as shown in FIG. 5), and/or may be oriented in any other suitable configuration.

Third platform 80 may include a substantially planar fourth surface 81. Third platform may be mechanically coupled to second platform 16 via weight sensors 82 each configured to sense a load weight. In some embodiments, such as those depicted in FIGS. 1-7, weight sensors 82 may be coupled to third surface 19 of second platform 16 proximate to where compression springs 20 are coupled to second surface 18 of second platform 16, so that each weight sensor 82 may detect the portion of an equipment load weight borne by its corresponding compression spring 20. In certain embodiments, third platform 80 may be coupled to second platform 80 such that fourth surface 81 is substantially parallel to third surface 19.

As shown in FIGS. 1-7, third platform 80 may include mounting openings 28. In operation, an item of equipment may be placed on a surface of third platform 80 opposite of fourth surface 81, and mounting openings 28 may receive screws, bolts, or other fasteners configured to mount equipment to third platform 80 for transport. Although FIGS. 1-7 depict apparatus 10 having four mounting openings 28, apparatus 10 may include any suitable number of mounting openings 28. In some embodiments, apparatus 10 may not include third platform 80 and/or weight sensors 82, in which case second platform 16 may include mounting openings 28 such that an item of equipment may be placed on a third surface 19 of second platform 16, and mounting openings 28 may receive screws, bolts, or other fasteners configured to mount equipment to second platform 16 for transport.

Compression spring control modules 84 may include any device, system, or apparatus configured to receive measurements of weight detected by weight sensors 82 and/or configured to tune compression springs 20. As depicted in FIG. 5, each compression spring control module 84 may include a display 86 and/or a compression spring tuning control 88. A display 86 may be communicatively coupled to a corresponding weight sensor 82 via a conduit 90 and may be configured to display an indication of a weight sensed by the corresponding weight sensor 82 (e.g., via a dial, gauge, digital readout, and/or other suitable manner). In addition or alternatively, each compression spring tuning control 88 may be communicatively coupled to a corresponding compression spring 20 via a conduit 90 and may be configured to tune its corresponding compression spring 20 (e.g., by tuning of the compression resistance of the corresponding spring). A conduit 90 may be an electrical conduit, fluidic conduit, and/or any other conduit configured to communicate a weight measured by a weight sensor 82 to a display 86 and/or communicate tuning parameters from a compression spring tuning control 88 to a compression spring 20.

In operation, compression spring control module 84 may facilitate individual tuning of each compression spring 20 based on the portion of equipment load weight proximate to such compression spring 20. In some embodiments, such individual tuning may be performed manually. For example, a user of apparatus 100 may examine the various weight loads displayed on displays 86 and, based on such examination, individually tune compression springs 20 using the corresponding compression spring tuning controls 88 (e.g., by setting the compression resistance higher for those compression springs 20 bearing more of the weight). In these and other embodiments, such individual tuning may be performed automatically. For example, each compression spring control module 84 may receive individual load weight measurements from the various weight sensors 82 and, based on such measurements, intelligently tune compression springs 20 (e.g., by setting the compression resistance higher for those compression springs 20 bearing more of the weight).

Each bearing assembly 94 may be configured to maintain registration of second platform 16 relative to first platform 12 (e.g., to prevent rotation of second platform 16 relative to first platform 12). In some embodiments, each bearing assembly 94 may be configured to prevent rotation of second platform 16 relative to first platform 12 about an axis substantially perpendicular to second surface 18. Although FIG. 6 depicts apparatus 10 having two bearing assemblies 94, apparatus 10 may include any suitable number of bearing assemblies 94.

As shown in FIG. 6, each bearing assembly 94 may include a bearing 96 and a corresponding opening 98 in first platform 12. Bearing 96 may be fixedly coupled to second platform 16 (e.g., via screws, bolts, or other fasteners) and may mate with opening 98 such that bearing 96 may slide in and out of opening 98 as second platform 16 moves relative to first platform 12 in a direction substantially perpendicular to first surface 14. In some embodiments, cross-sectional dimensions of a bearing 96 (e.g., radius) may be approximately equal to those of opening 98. Bearing 96 may be constructed from any suitable material, including without limitation, aluminum.

In some embodiments, bearing assembly 94 may be affixed to apparatus 10 in a manner different than that shown in FIG. 6. For example, in some embodiments, a bearing 96 of bearing assembly 94 may be fixedly coupled to first platform 12 (e.g., via screws, bolts, or other fasteners) and may mate with an opening on second platform 16 similar to opening 98 such that bearing 96 may slide in and out of the opening on second platform 16 as second platform 16 moves relative to first platform 12 in a direction substantially perpendicular to first surface 14.

Skirt 24 may be coupled first platform 12, and may be made of any suitable material. Skirt 24 may include one or more openings configured to receive screws, bolts, or other fasteners to allow a crate or other shipping container to be coupled to apparatus 10 (e.g., for shipping and transport).

Reliefs 26 may be coupled to first platform 12, and may be configured to offset first platform 12 from the ground, floor, or other surface to permit a forklift or other vehicle to lift and transport apparatus 10. Although FIGS. 1-7 depict apparatus 10 having three reliefs 26, apparatus 10 may include any suitable number of reliefs 26.

Although FIGS. 1-4 depict an embodiment of apparatus 10 different than that depicted in FIGS. 5-7, embodiments of apparatus 10 may include any combination of components of the embodiments depicted in this disclosure.

Using the methods and systems disclosed herein, problems associated with conventional approaches to transporting sensitive items of equipment may be improved, reduced, or eliminated. For example, compression springs 20 of apparatus 10 may provide mechanical elasticity between first platform 12 and second platform 16, thus providing resistance to mechanical shock and vibration, while one or more damping assemblies 22 may provide damping of oscillations produced by compression springs 22, thus further reducing mechanical shock and vibration. Accordingly, in certain embodiments, the deflection of second platform 16 in a direction substantially perpendicular to bottom surface 18 may not exceed approximately 2.34 inches. Also, compression spring control modules 84 may allow for individual tuning compressions springs 22, permitting even greater control over reduction of mechanical shock and vibration.

In addition, damping assemblies 22 may be oriented relative to first platform 12 and second platform 16 such to create a low vertical profile during transport. For example, a damping assembly angle 66 defined by top surface 14 of first platform 12 and first extension 43 may be approximately 39 degrees in an unloaded state. In the same or alternative embodiments, damping assembly angle 66 may be approximately 20 degrees in a loaded state. As another example, a shock absorber angle 70 defined by bottom surface 18 of second platform 16 and the longitudinal axis of shock absorber 32 may be approximately 4 degrees in an unloaded state. In the same or alternative embodiments, shock absorber angle 70 may be approximately 6 degrees in an unloaded state.

Such a low vertical profile may be useful when transporting equipment via certain shipping methods (e.g., when shipping via tractor trailer, as in some instances trailer heights are limited to 92 inches).

Furthermore, bearing assemblies 94 may provide additional protection by maintaining registration and reducing rotation between first platform 12 and second platform 16, further preventing or reducing mechanical shock or vibration to equipment transported using apparatus 10.

Although the present disclosure and its advantages have been described in detail, it should be understood that various changes, substitutions and alterations can be made herein without departing from the spirit and scope of the disclosure as defined by the following claims.

What is claimed is:

1. An apparatus for transporting equipment, comprising:
a first platform having a substantially planar first surface;
a second platform having a substantially planar second surface substantially parallel to the first surface, the second platform mechanically coupled to the first platform via a plurality of compression springs allowing movement of the second platform relative to the first platform;
a damping assembly mechanically coupled to the first platform and the second platform, the damping assembly configured to dampen movement of the second platform relative to the first platform; and
a bearing assembly mechanically coupled to the first platform and the second platform and configured to maintain a horizontal position of the second platform relative to the first platform along an axis substantially parallel to the first surface, the bearing assembly comprising:
a bearing fixedly coupled to one of the first platform and the second platform; and
an opening corresponding to the bearing in the other of the first platform and the second platform, wherein the bearing is configured to mate with the opening such that the bearing may slide in a vertical axis relative to the opening as second platform moves vertically relative to first platform.

2. An apparatus according to claim 1, the damping assembly including:
an arm located between the first surface and the second surface, the arm pivotally coupled to the first platform and slidably coupled to the second platform; and
a shock absorber mechanically coupled between the first platform and the arm, such that the shock absorber dampens rotation of the arm to dampen movement of the second platform relative to the first platform.

3. An apparatus according to claim 1, the damping assembly including a shock absorber mechanically coupled between the first platform and the second platform.

4. An apparatus according to claim 1, the damping assembly further configured to dampen movement of the second platform relative to the first platform in an axis substantially perpendicular to the first surface.

5. An apparatus according to claim 4, the damping assembly further configured to dampen movement of the second platform relative to the first platform in the axis substantially parallel to the first surface.

6. An apparatus according to claim 1, further comprising a second damping assembly mechanically coupled to the first platform and the second platform, the second damping assembly configured to dampen movement of the second platform relative to the first platform.

7. An apparatus according to claim 1, at least one of the plurality of compression springs comprising a gas spring.

8. An apparatus according to claim 1, wherein the compressive force of the plurality of springs is substantially perpendicular to the first surface.

9. An apparatus for transporting equipment, comprising:
a first platform having a substantially planar first surface;
a second platform having a substantially planar second surface substantially parallel to the first surface, the second platform mechanically coupled to the first platform via a plurality of tunable compression springs allowing movement of the second platform relative to the first platform;
a weight sensor coupled to the second platform;
a controller configured to tune the compression resistance of a tunable compression spring of the plurality of tunable compression springs based on an output of the weight sensor; and
a damping assembly mechanically coupled to the first platform and the second platform, the damping assembly configured to dampen movement of the second platform relative to the first platform, the damping assembly including a shock absorber mechanically coupled between the first platform and the second platform.

10. An apparatus according to claim 9:
the first surface having a first pivot support member, the first pivot support member having a first bearing and a first opening configured to receive the first bearing, the first bearing configured to pivotally couple the shock absorber to the first platform; and
the second surface having a second pivot support member, the second pivot support member having a second bearing and a second opening configured to receive the second bearing, the bearing configured to pivotally couple the shock absorber to the second platform.

11. An apparatus according to claim 9, at least one of the plurality of compression springs comprising a gas spring.

12. An apparatus according to claim 9, wherein the compressive force of the plurality of springs is substantially perpendicular to the first surface.

13. An apparatus according to claim 9, the damping assembly further configured to dampen movement of the second platform relative to the first platform in an axis substantially perpendicular to the first surface.

14. An apparatus according to claim 13, the damping assembly further configured to dampen movement of the second platform relative to the first platform in an axis substantially parallel to the first surface.

15. An apparatus according to claim 9, further comprising a second damping assembly mechanically coupled between the first platform and the second platform, the second damping assembly configured to dampen movement of the second platform relative to the first platform, the second damping assembly including a second shock absorber mechanically coupled between the first platform and the second platform.

16. An apparatus according to claim 15, the second damping assembly further configured to dampen movement of the second platform relative to the first platform with respect to an axis substantially perpendicular to the first surface.

17. An apparatus according to claim 16, the damping assembly further configured to dampen movement of the second platform relative to the first platform in a first axis substantially parallel to the first surface, and the second damping assembly further configured to dampen movement of the second platform relative to the first platform in a second axis substantially parallel to the first surface and substantially perpendicular to the first axis.

18. An apparatus according to claim 9, wherein the shock absorber comprises a magnetoheological fluid damper.

* * * * *